United States Patent
Sheedy

[15] 3,663,335
[45] May 16, 1972

[54] INSULATED HEAT PACKS
[72] Inventor: Richard E. Sheedy, Huntington Sta., N.Y.
[73] Assignee: Fiberglass Resources Corp., Farmingdale, N.Y.
[22] Filed: Nov. 20, 1969
[21] Appl. No.: 878,453

[52] U.S. Cl...............156/380, 156/381, 156/499, 29/498.5
[51] Int. Cl..........................B29c 27/06, B23k 31/00
[58] Field of Search............156/381, 380, 583, 499; 29/498.5

[56] References Cited

UNITED STATES PATENTS

| | | | |
|---|---|---|---|
| 3,158,363 | 11/1964 | Breckenridge | 29/498.5 X |
| 3,307,997 | 3/1967 | Detrick | 156/499 X |
| 3,308,532 | 3/1967 | Long et al. | 29/498.5 X |

*Primary Examiner*—Benjamin A. Borchelt
*Assistant Examiner*—J. J. Devitt
*Attorney*—Leonard H. King

[57] ABSTRACT

A heat source assembly for use in adhesively joining together thermosetting resin impregnated members.

A heat source consisting of a combustible material is enclosed in a non-combustible insulation which moderates the flow of heat to the joint area and also prevents rapid cooling to maintain uniform heating temperatures.

The aforementioned abstract is neither intended to define the invention of the application which, of course, is measured by the claims, nor is it intended to be limiting as to the scope of the invention in any way.

2 Claims, 5 Drawing Figures

Patented May 16, 1972

3,663,335

INVENTOR.
RICHARD E. SHEEDY

BY Leonard H. King

ATTORNEY

INSULATED HEAT PACKS

This invention relates to an improved apparatus and method for adhesively joining together contiguous thermosetting resin impregnated filament reinforced members and in particular the adhesive bonding of tubular fiber glass articles.

BACKGROUND OF THE INVENTION

In U.S. Pat. No. 3,307,997, issued to R. S. Detrick, there is disclosed an apparatus for use in adhesively joining together contiguous thermosetting resin impregnated filament reinforced members which comprises a thin metallic band adapted to conform to and have its bottom side temporarily secured to the outer surface of one of the members at a location adjacent to the adhesive. A continuous length of an exothermic auto-combustible fuel element is attached to the top side of the thin metallic band, and after clamping the assembly to the members to be joined the fuel element is ignited to generate heat that is transmitted through the band and through one member to the adhesive and the second member to raise their temperature in order to reduce the normal setting time of the epoxy adhesive.

In practice this technique has been found to have two major defficiencies. First, the heat generated by the exothermic fuel is rapidly transmitted to the resin so that the temperature of the resin, which should be maintained at 100° C. for proper setting, may rise above this limit and be degraded. Secondly, the duration of the application of heat is very short. Furthermore, under extreme cold conditions the heat is not maintained at the proper temperature for a sufficient length of time with a normal supply of fuel. Using larger fuel supplies increases the possibility of increasing the temperature above the desirable limits and burning or charring the material to be joined.

The present invention overcomes these problems by providing an insulating blanket of a non-combustible material, above and below the heating material. This serves to alter the characteristic heating curve so that for a given amount of fuel the temperature of the resin is raised to the desirable level and is maintained at this proper temperature for a longer period of time, thereby providing the necessary combination of time and temperature to accomplish proper curing or setting.

The object of the present invention is to provide an improved heat source for adhesively joining together resin impregnated members.

Another object of the present invention is to provide an apparatus and method of reliably joining resin impregnated members in relatively cold ambients.

Figure 1:
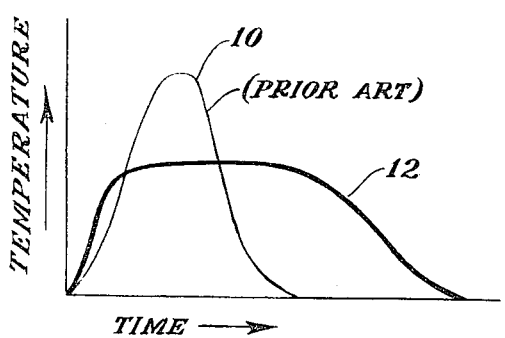
FIG. 1 is the temperature versus time curves for the prior art and present methods of adhesively joining two members.

Referring to FIG. 1, wherein the temperature versus time curves of the new and old techniques are presented. The temperature versus time curve 10 is typical of that obtainable burning an exposed exothermic combustible material directly against a metal foil shield. Peak temperature is reached, which may exceed the desired temperature, in approximately 5–10 minutes. The increase in temperature generated by burning the exothermic auto-combustible substance attached to the metal clamping strip surrounding the member to be joined is sufficient to reduce the curing time of the epoxy adhesive reliable and did not yield consistent results.

The temperature versus time curve 12 of the present invention shows a peak temperature applied to the joint somewhat less than that obtained by the old method. However, the temperature is high enough to substantially reduce the curing time when compared to a cure at room temperature. In addition, the elevated temperature is maintained for a considerably longer time (20–30 min.) and tapers off more slowly after the fuel has expended itself. This temperature effect substantially reduces the curing time required to bond two pieces of material together and creates a strong junction capable of further handling immediately thereafter. In the construction of a plastic pipe line many joints of this type must be made. A tremendous amount of time is saved, when the present embodiment is utilized, since the time lost after a joint is made and until it may be handles further is reduced substantially.

Figure 2:
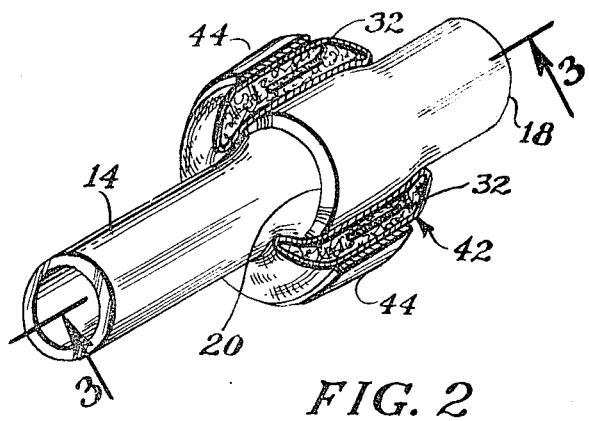
FIG. 2 is an isometric view of two pipes connected by a lap joint.
Figure 3:
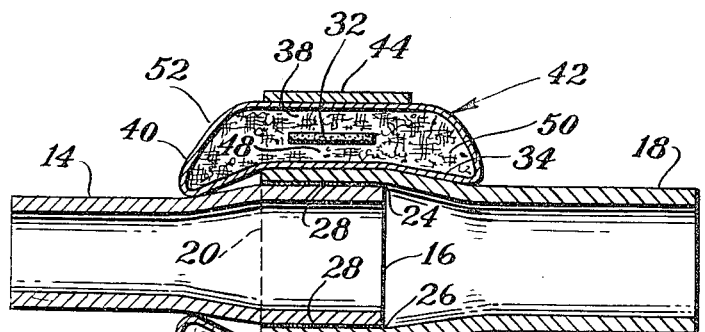
FIG. 3 is a cross section view of a lap joint taken along line 3—3 of FIG. 2 surrounded by an embodiment of the present invention.

Referring to FIGS. 2 and 3, the construction and application of the embodiment of the present invention becomes apparent. A pipe 14 having a taped edge 16 is prepared for joining with a second pipe 18 having a bell shaped opening 20 which has a taper designed to match that of taper 16 with a small clearance. Intimate contact is obtained at points 24 and 26. A two part epoxy adhesive 28 which may be similar to that described in the Detrick patent is mixed and then applied to the outer surface of taper 16 of pipe 14 and the inner surface of the bell shaped opening 20 of pipe 18.

The fuel element 30 may be similar to the one described in the Detrick patent and is comprised of a combustible fuel board 32.

The fuel board 32 is a laminar structure of dry combust-ible material that generates considerable exothermic heat upon combustion. The heat energy source is a self-oxygenating type of fuel within the fuel board, that is quick burning at the surface, and that burns substantially flameless at a constant rate.

The fuel element 30 is surrounded by a non-combustible insulating material 38 which may be rock wool, fiber glass, asbestos fiber or the like. The thickness of the insulating material 38 is substantially thicker on the outer surfaces of the heat element 30. The insulated padding structure of heat pack 42 is not unlike the padding used in the insulation of walls and roofs in the construction of private houses today. Further enclosing the heat element 30 and insulating material 38 is a metallic foil 40 preferably aluminum. The heat pads 42 are wrapped around the joint which has been properly prepared and held in place with wire or strap 44.

Extending out from the fuel element 30 is a fuse or wick 46 which is used to ignite the fuel board 32.

The theory of operation may be explained as follows:

The heat pack 42 having been applied to a properly prepared pipe joint and held in place with band 44 will insure the minimum curing time of the epoxy adhesive. The fuse 46 is ignited and reaches the fuel board 32 which then starts to burn. Containing its own oxygen, it need not be supplied from an external source. The fuel burns at a slow rate transferring its heat to the thin insulated padding area 48, the metal foil 40 to the pipe 18, adhesive 28 and pipe 14. The thick insulated area 50 and the outer metal foil 52 is sure to reduce and reflect the heat leakage from the outer surfaces back toward the inner surface where it is required. Heat loss is maintained at a minimum in this manner and makes for the maximum efficiency of the fuel utilized. Sharp peaks in temperature appearing at the pipe joint do not occur since the thin insulated area 48 tends to reduce or minimize this effect. When the fuel board 32 has completed its burning, heat is maintained at the joints because of the insulation 38. The heat pack 42 may be removed as soon as the joint bond solidifies.

The present invention is not limited to the adhesive joining of pipes but works equally as well when repairing patches in flat or curved surfaces such as found in fiber glass boats and auto bodies.

Figure 4:
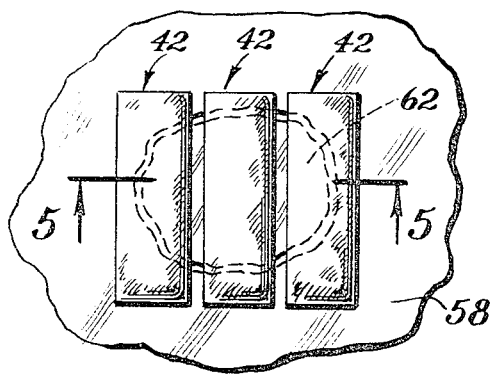
FIG. 4 is a top view of a hole in fiberglass in the process of being repaired.
Figure 5:
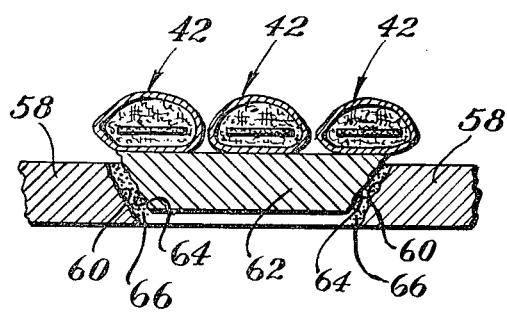
FIG. 5 is a cross-section of FIG. 4 taken along line 5—5.

The flat area 58 to be repaired would be prepared in a similar manner to the pipe joint with a taper edge 60 made on the hole. A patch piece 62 would be cut to fit the hole and would have mating tapered edges 64. The epoxy adhesive 66 would then be applied to the tapered edges and the repair patch 62 inserted therein. The heat pack 42 would be applied across the patch 62 and the tapered edges 60 and 64 either in a multiple arrangement as shown in FIGS. 4 and 5, or a single unit of sufficient width would be utilized. The heat pack assembly 42 could be held in place by sand bags or other suitable means such as pressure sensitive adhesive tape.

In joining pipeline sections at sub-zero temperatures the heat pack of this invention has been used to warm the contents of the epoxy adhesive component by wrapping the heat pack around the can and igniting the fuel element. As a result of the insulating quality of the heat pack, the contents were found to be warm and fluid and easily mixed and poured, despite the sub-zero conditions.

What I claim and desire to secure by Letters Patent:

1. A heat pack for use in adhesively joining together a pair of contiguous members employing a thermocuring resin adhesive interposed between the members, comprising:

a. an elongated combustible fuel element;
b. a non-combustible insulating mass surrounding said fuel element whereby at least a portion of the insulating mass is interposed between the said fuel element and at least the nearer one of the contiguous members;
c. a flexible cover member surrounding said non-combustible mass, at least a portion of said cover member being formed of a flexible metal heat conductive sheet; and
d. means to clamp said heat pack to the members to be adhesively joined.

2. The heat pack of claim 1 including a metallic foil wrapper surrounding the said insulating mass.

* * * * *